UNITED STATES PATENT OFFICE.

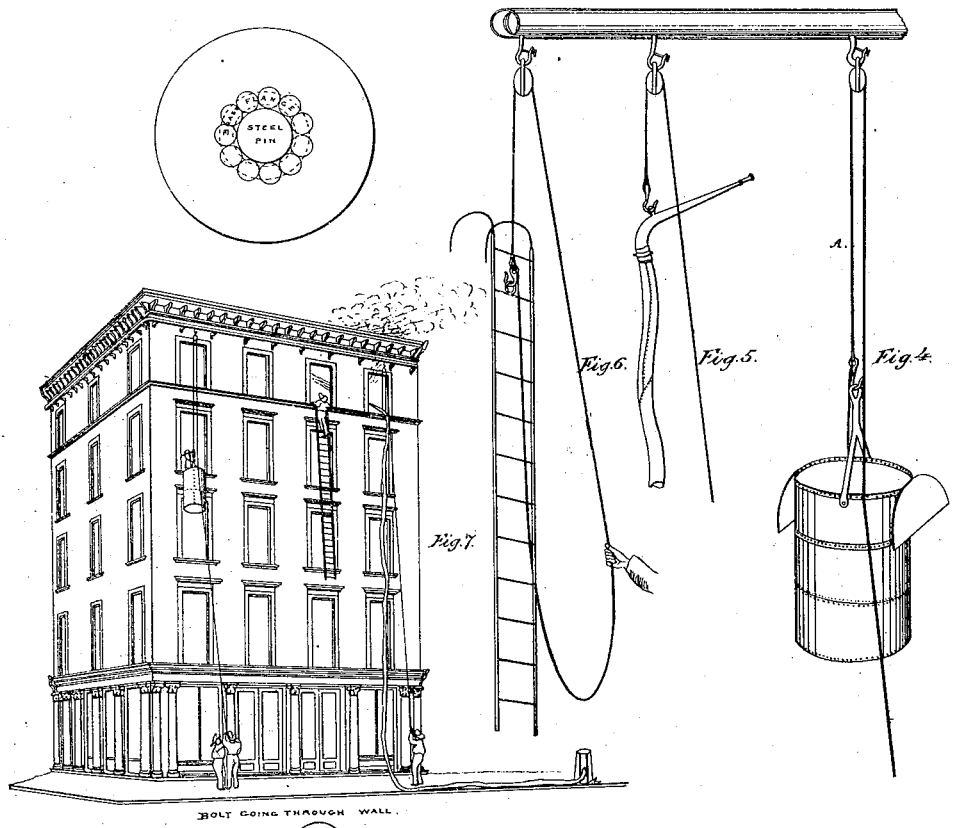
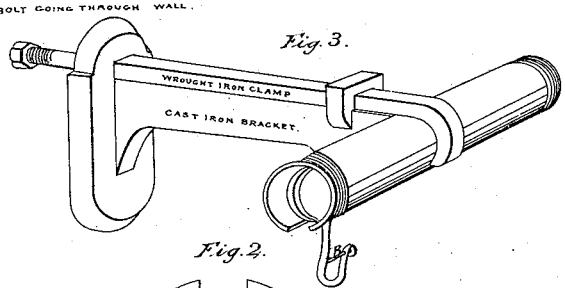
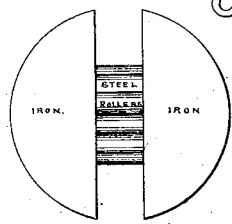

JOHN W. MACKENZIE, OF BROOKLYN, NEW YORK.

IMPROVED FIRE-ESCAPE.

Specification forming part of Letters Patent No. 33,710, dated November 12, 1861.

*To all whom it may concern:*

Be it known that I, JOHN W. MACKENZIE, of Brooklyn, Kings county, New York, have invented a new and improved system of providing buildings with a continuous road or way for a self-adjusting traversing or pendent tackle or life-line to be permanently located upon buildings for the purposes of saving life and property from destruction by fire, the whole being arranged and combined as shown or in any equivalent way, so as to operate as and for the purposes set forth; and I do hereby declare that the following is a full and exact description thereof.

The nature of the invention consists of a method and combination of arrangements, as shown by the drawings, which provide a continuous fire and water proof road or way for a pendent tackle whose working and directing power is from the street—a means by which a tackle can be shifted along the front and around a building and raised and lowered to any desired point without the aid of any person aloft. The means I use is a round slotted tube, three inches outer diameter and two and a half inches inner diameter, connected by slotted couplings or sleeves and held under the cornice of the building by slotted or clamped bolt-brackets. The lower part of the pipe or tube is open, and inside the tube is an iron traveling ball which revolves upon inner wheels. An iron strap is attached to said ball and comes through the opening in the tube. From this strap descends a tackle to which a life-car can be attached in a moment and raised or lowered at will. The ball moves inside the tube, and by this means the life-car can be carried from window to window all over the house. In cases of isolated or corner buildings the tube can be fixed all around them and the ball with the life-car or hose attached can be moved in a minute around the entire building. The entire apparatus is fire-proof and can be worked by one or two men upon the sidewalk with perfect ease.

The drawings hereunto annexed exhibit the application of the principles of my invention.

Figure 1 in drawings represents a section of the traveling ball. The anti-friction rollers are made of steel and revolve in brass flanges. Brass is used to prevent corrosion. Fig. 2 represents the form of the traveling ball without strap; half spheres of the ball made of chilled iron. The axle or shaft of the ball is steel, secured by riveting at both ends. Fig. 3 represents the traveling ball complete in a length of tube-road which can be connected and extended by slotted couplings. The bracket is cast-iron. A clamp-bolt of wrought-iron holds the tube and secures the bracket to the wall. Fig. 4 represents the metallic life-car to be used as shown in Fig. 7. Fig. 5 represents the auxiliary aid in suppressing fire, to be used as shown in Fig. 7. Fig. 6 represents the auxiliary aid, to be used as shown in Fig. 7. Fig. 7 represents the diagram of a building showing the position of the slotted iron way and means of securing it, together with supplementary traveling ball.

Letter A is a wire rope or chain girt-line rove through a metal block.

Letter B is the iron mousing-pin to prevent the girt-line from the possibility of unhooking.

Letter C is the vault for life-car, as shown, and slotted tube for concealing and protecting the wire rope. The car is hooked to the girt-line at all times and may be conveyed to any window.

What I claim, therefore, as my invention, and desire to secure by Letters Patent, is—

The round slotted tube-road and traveling roller, as shown in the drawings, and the arranged combination of fire and water proof tube-road and traveler, with fire-proof pendent tackle and iron mousing-pin in hook, as arranged and described, for the purpose of saving life and property and the raising of hose and water to any part of the building, substantially as herein described.

JOHN W. MACKENZIE.

Witnesses:
WM. JOHNSON,
W. ROCHE.